(12) United States Patent
Knowles

(10) Patent No.: US 7,770,600 B2
(45) Date of Patent: Aug. 10, 2010

(54) HYDRAULIC RESTRICTOR

(75) Inventor: Grahame Knowles, Lincoln (GB)

(73) Assignee: Siemens Aktiengesellschaft, Munich (DE)

( * ) Notice: Subject to any disclaimer, the term of this patent is extended or adjusted under 35 U.S.C. 154(b) by 241 days.

(21) Appl. No.: 11/629,372

(22) PCT Filed: Jun. 9, 2005

(86) PCT No.: PCT/EP2005/052670

§ 371 (c)(1),
(2), (4) Date: Oct. 7, 2008

(87) PCT Pub. No.: WO2005/121628

PCT Pub. Date: Dec. 22, 2005

(65) Prior Publication Data

US 2009/0133759 A1    May 28, 2009

(30) Foreign Application Priority Data

Jun. 12, 2004    (GB) .................................. 0413156.1

(51) Int. Cl.
F15D 1/02    (2006.01)

(52) U.S. Cl. .......................................... 138/43; 138/46

(58) Field of Classification Search ................... 138/43, 138/46

See application file for complete search history.

(56) References Cited

U.S. PATENT DOCUMENTS

| 1,467,522 | A |   | 9/1923  | Amsler |
|-----------|---|---|---------|--------|
| 1,507,378 | A | * | 9/1924  | Hormann ...................... 138/46 |
| 2,299,540 | A | * | 10/1942 | Hartline ...................... 137/605 |
| 2,568,084 | A | * | 9/1951  | Mockridge ............. 137/614.11 |
| 3,151,783 | A | * | 10/1964 | Shaw et al. .................. 222/335 |
| 4,523,602 | A | * | 6/1985  | Snyder ....................... 137/467 |
| 4,632,359 | A | * | 12/1986 | Tooth ......................... 251/126 |
| 4,724,869 | A | * | 2/1988  | Carter ......................... 138/45 |
| 5,016,673 | A | * | 5/1991  | Carter et al. .................. 138/45 |
| 5,526,883 | A | * | 6/1996  | Breaux ....................... 166/373 |
| 5,996,615 | A |   | 12/1999 | Zuegner et al. |

FOREIGN PATENT DOCUMENTS

GB    1 273 540    5/1972

* cited by examiner

*Primary Examiner*—James F Hook

(57) ABSTRACT

A hydraulic restrictor comprising: a passage along which hydraulic fluid flows; a member which extends along the passage, the member restricting the flow along the passage; and structure for selectively securing the member at a plurality of different positions along the passage thereby to enable variation in the restriction on flow along the passage, the securing structure securing the member at each position by securing the member against the side wall of the passage.

6 Claims, 2 Drawing Sheets

HYDRAULIC RESTRICTOR

CROSS REFERENCE TO RELATED APPLICATIONS

This application is the US National Stage of International Application No. PCT/EP2005/052670, filed Jun. 9, 2005 and claims the benefit thereof. The International Application claims the benefits of English Patent application No. 0413156.1 filed Jun. 12, 2004. All of the applications are incorporated by reference herein in their entirety.

FIELD OF INVENTION

This invention relates to a hydraulic restrictor.

BACKGROUND OF THE INVENTION

In UK patent application no. (ref. 2004P01248 GB) filed on the same day as the present application, hydraulic restrictors are used in an apparatus for damping the torsional excitation of a drive shaft. The damping is linear and viscous. Accordingly, it is required that the design of restrictor used promote laminar flow, and provide a constant and repeatable restriction (pressure-drop/flow characteristic) under all operating conditions.

In the case of a fixed value restrictor, laminar flow and constant and repeatable restriction may be achieved by careful design of the geometry of the restrictor (this is of course up to a certain flow rate threshold). In the case of a variable restrictor, the design is much more complex, and consequently stable/repeatable operation is difficult to achieve.

SUMMARY OF INVENTION

A possible variable restrictor comprises a passage, and a series of switching devices positioned at various distances along the passage. Variable restriction is achieved by switching in circuit different lengths of the passage. Such a design would provide constant and repeatable variable restriction (pressure-drop/flow characteristics), but is a complex and cumbersome design.

Another possible more compact variable restrictor comprises a bore, and a spool or piston which extends along the bore. The hydraulic fluid would pass along the bore in the annular space formed between the spool and the bore. Variable restriction would be achieved by varying the length of engagement of the spool with the bore, and hence the length of the spool along which the fluid must pass. This design is especially vulnerable to variation in eccentricity between the spool and bore. For a given pressure drop across the restrictor, laminar flow may vary by up to 250 percent depending on the eccentricity between the spool and bore. This vulnerability can lead to lack of repeatability and instability.

According to the present invention there is provided a hydraulic restrictor comprising: a passage along which hydraulic fluid flows; a member which extends along said passage, said member restricting the flow along the passage; and means for selectively securing said member at a plurality of different positions along the passage thereby to enable variation in the restriction on flow along the passage, said securing means securing said member at each said position by securing the member against the side wall of the passage.

Preferably, the securing means secures the member against the side wall of the passage by acting on the opposite side of the member to the side wall.

The securing means suitably acts on the flat base of a groove formed in the said opposite side of the member.

The securing means may include a plurality of setting shims which interact with one end of the member to assist in the selective securing of the member at the plurality of different positions.

Preferably, the one end of the member comprises a length of the member of reduced width and the shims are secured against a shoulder formed between the length of reduced width and the remainder of the member.

Preferably: a section of the passage is of expanded width; an end of the member is disposed between the section of expanded width and one end of the passage; and fluid flow through the restrictor is between the section of expanded width and said one end of the passage.

The plurality of different positions of the member may be such that the position of said disposed end of the member may be varied between a position immediately beside the section of expanded width and a position a predetermined maximum distance away from the section of expanded width.

The restrictor suitably comprises a plurality of cross-holes which extend radially outward from the section of expanded width and supply fluid to/receive fluid from the section of expanded width.

Preferably, said passage and said member are of cylindrical form.

BRIEF DESCRIPTION OF THE DRAWINGS

The invention will now be described, by way of example, with reference to the accompanying drawings, in which.

DETAILED DESCRIPTION OF INVENTION

Figure 1:
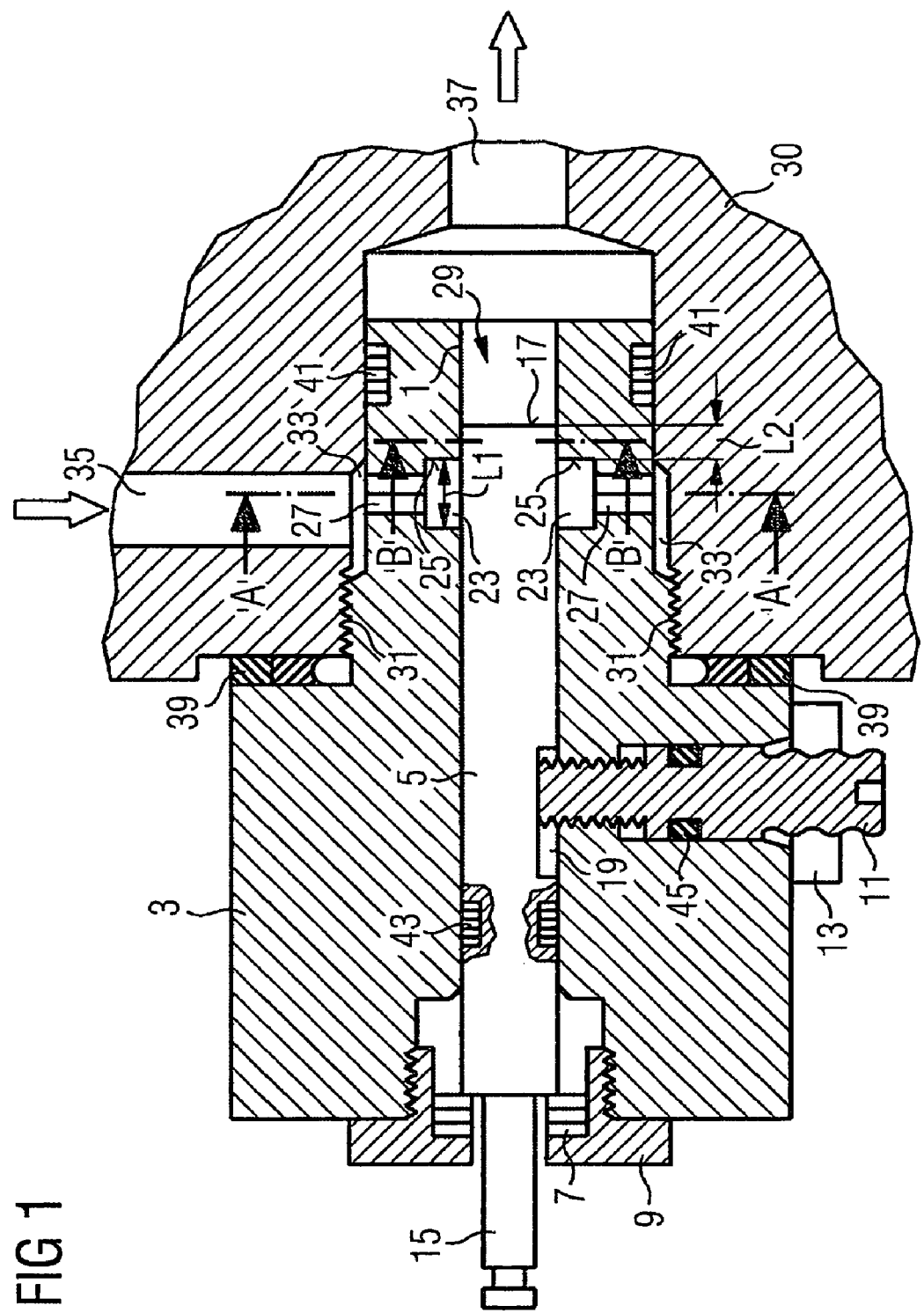
FIG. 1 is a longitudinal cross-section through a restrictor in accordance with the present invention.

Referring to FIG. 1, the restrictor comprises a bore 1 formed in a cartridge body 3, and a spool 5 which extends along bore 1. Bore 1 and spool 5 are cylindrical in form.

The restrictor further comprises setting shims 7, restraining nut 9, and locking screw 11 together with associated locknut 13. Spool 5 includes a spool extension 15 of smaller diameter than the main body of spool 5.

The number of setting shims 7 determines the position along bore 1 of planar end 17 of spool 5. The shims 7 encircle spool extension 15 and are secured between restraining nut 9 and the shoulder formed between spool extension 15 and the main body of spool 5. Spool extension 15 is drawn to the left in FIG. 1 to hold shims 7 firmly between restraining nut 9 and the aforesaid shoulder. Locking screw 11 and its associated locknut 13 are then used to secure spool 5 in position by securing spool 5 against the side wall of bore 1. A groove 19 machined in spool 5 receives locking screw 11. Locking screw 11 acts against the flat bottom of groove 19. Groove 19 also serves to limit axial movement of spool 5 during adjustment of the position of spool 5.

Figure 2:
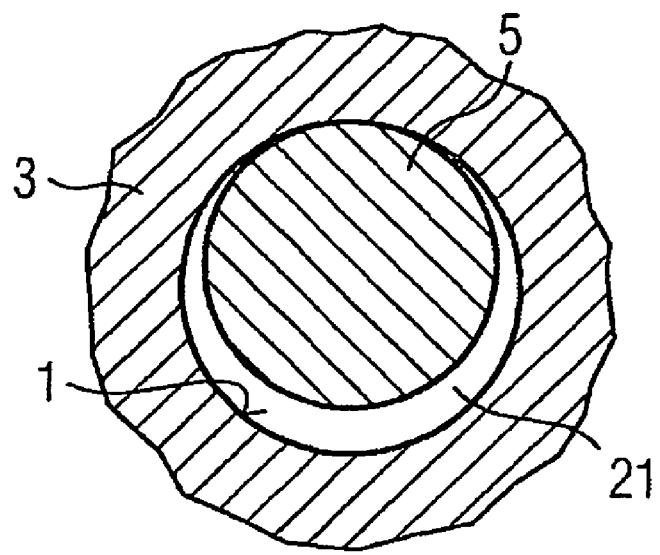
FIG. 2 is a cross-section on the line B-B in FIG. 1.

Referring also to FIG. 2, spool 5, when secured in position within bore 1, is fully eccentric with bore 1, i.e. the axis of spool 5 is as far as is possible from the axis of bore 1. An elongate space 21 having parallel sides and a cross-section as shown in FIG. 2 is defined between spool 5 and bore 1.

Figure 3:
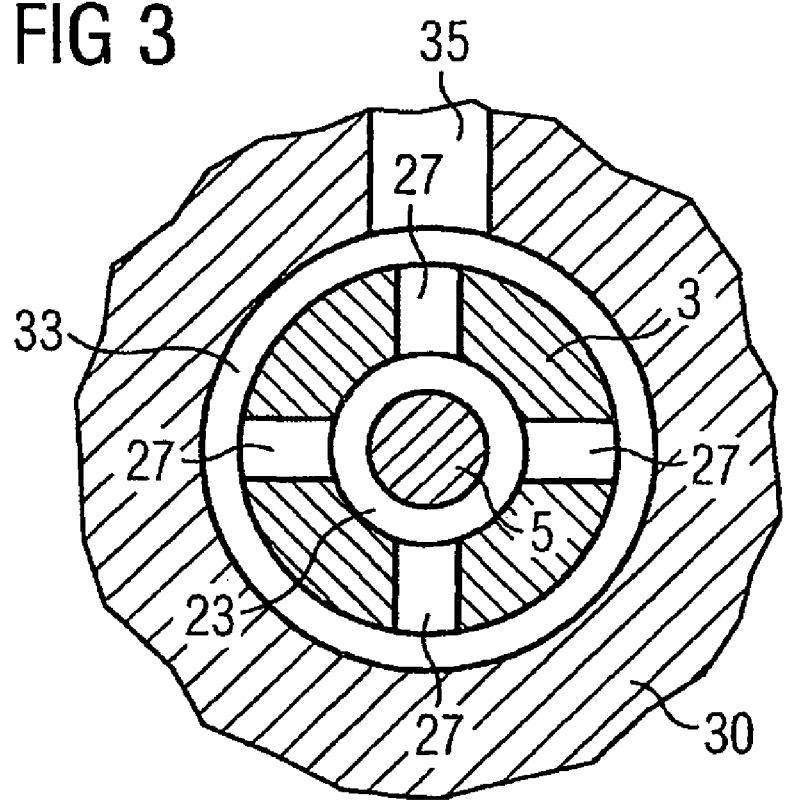
FIG. 3 is a cross-section on the line A-A in FIG. 1.

The diameter of bore 1, over a short length L1 of bore 1, is increased. Referring also to FIG. 3, this creates within cartridge body 3 an internal annular groove 23 concentric with bore 1. Planar end 17 of spool 5 is located a distance L2 along bore 1 from adjacent side 25 of groove 23. The distance L2 can be varied between zero and a maximum value by varying the number of setting shims 7. Cartridge body 3 further comprises four cross-holes 27 which extend radially outward from groove 23 and are spaced at 90 degree intervals around groove 23.

The restrictor may be used in "forward" or "reverse" modes of operation. In forward mode, hydraulic fluid is supplied to the restrictor by means of cross-holes 27 and leaves the restrictor by way of open end 29 of bore 1. In reverse mode, hydraulic fluid is supplied to the restrictor by means of open end 29 and leaves the restrictor by way of cross-holes 27. In each mode of operation the flow of hydraulic fluid between cross-holes 27 and open end 29 is restricted by spool 5, and the amount of restriction is determined by the length L2 of spool 5 between side 25 of groove 23 and planar end 17 of spool 5. This length L2 is determined by the number of setting shims 7 used. Thus, the restriction on flow (pressure-drop/flow characteristic) may be varied by varying the number of setting shims 7. Shims 7 enable variation in restriction over a number of discrete values of restriction. Infinite adjustment could be provided by the use of a screw. The screw must not radially restrain spool 5.

In FIG. 1 the restrictor is shown secured to a unit 30 by means of screw threads 31 formed on cartridge body 3 and unit 30. An annular space 33 concentric with bore 1 exists between cartridge body 3 and unit 30, see also FIG. 3. Cross-holes 27 open into annular space 33. The restrictor is used in the forward mode of operation. A supply passage 35 in unit 30 supplies hydraulic fluid to annular space 33. The fluid passes down cross-holes 27 to groove 23, along elongate space 21 between spool 5 and bore 1, and to open end 29 of bore 1. A receiving passage 37 in unit 30 receives the fluid from open end 29. Passage 37 is of expanded diameter in the region where it meets open end 29.

In FIG. 1 seals 39, 43, 45 prevent egress of hydraulic fluid to the outside of the assembly and absorption of air by the fluid, and seal 41 prevents egress of fluid between annular space 33 and passage 37.

In the above described restrictor variation in eccentricity between bore 1 and spool 5 is prevented by the securing of spool 5 against the side wall of bore 1. Bore 1 and spool 5 are of plain cylindrical construction so that movement of spool 5 radially is unrestricted except by the side wall of bore 1. Spool 5 is able to be secured fully against the side wall of bore 1 since there are no stepped diameters, threads, or other forms of obstruction or irregularity that might result in the tipping or cocking of spool 5 within bore 1. In all set positions of spool 5 along bore 1, the eccentricity between spool 5 and bore 1 is the same (the axes of spool 5 and bore 1 are parallel and fully eccentric). Accordingly, variation in restriction between the set positions is dependent only on length L2. The construction of the restrictor should be sufficiently solid that there is no vibration between spool 5 and bore 1 as this would result in unstable operation.

The invention claimed is:

1. A hydraulic restrictor, comprising:
   a passage having side walls along which a hydraulic fluid flows;
   a member that extends along the passage and restricts the flow within the passage; and
   a securing device that selectively secures the member at a plurality of different locations against the side wall of the passage to enable variation in the restriction of flow;
   wherein the securing device secures the member against the side wall of the passage by acting on an opposite side of the member to the side wall;
   wherein the securing device acts on a flat base of a groove in the opposite side of the member;
   and wherein the securing device includes a plurality of setting shims that interact with an end of the member to assist in the selective securing of the member at the plurality of different positions.

2. The restrictor according to claim 1, wherein the end of the member comprises a length of the member having a reduced width and the plurality of shims are secured against a shoulder formed between the length of reduced width and the remainder of the member.

3. The restrictor according to claim 2, wherein a portion of the passage has an expanded width, the end of the member is disposed between the section of expanded width, and an end of the passage, and fluid flow through the restrictor is between the section of expanded width and the one end of the passage.

4. The restrictor according to claim 3, wherein the plurality of different positions of the member is such that the position of the disposed end of the member is varied between a position immediately beside the section of expanded width and a position a predetermined maximum distance away from the section of expanded width.

5. The restrictor according to claim 4, further comprising a plurality of cross-holes which extend radially outward from the section of expanded width and supply fluid to receive fluid from the section of expanded width.

6. The restrictor according to claim 5, wherein the passage and the member are cylindrical.

\* \* \* \* \*